United States Patent Office 2,698,756
Patented Jan. 4, 1955

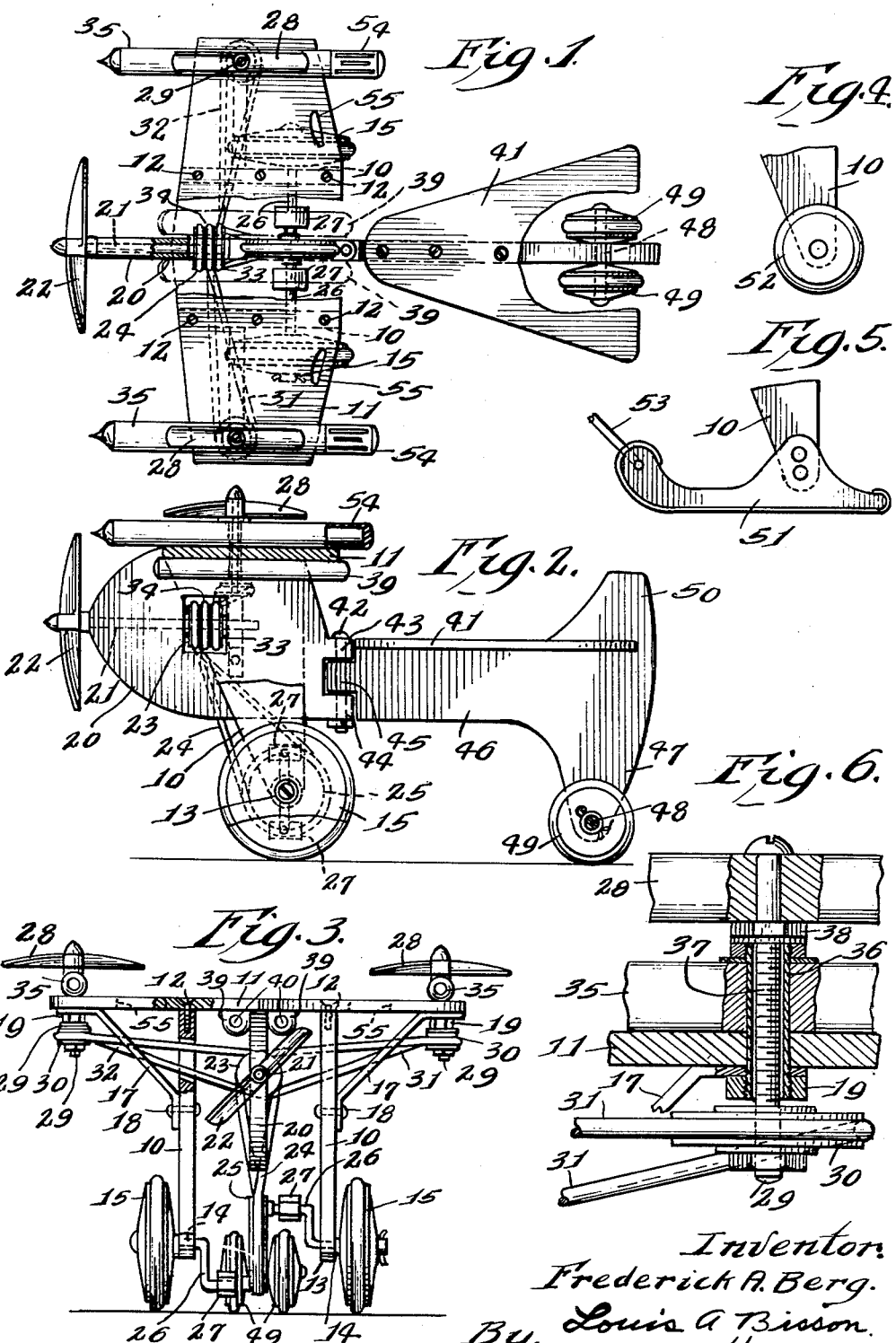

2,698,756
TOY AIRCRAFT

Frederick A. Berg, Chicago, Ill.

Application April 24, 1952, Serial No. 284,076

2 Claims. (Cl. 280—1.12)

The present invention relates to the art of toys, and more particularly to that type of toys useful for children and having parts in simulation of aircraft and operable by a child when used and operated by a child when moved by the child over the ground to so operate the parts in simulation of the aircraft features for instruction and entertainment of the child.

An object of the present invention is to provide a novel means for not only propelling the device over the ground but for also propelling various parts in simulation of an aircraft.

Other objects, advantages, capabilities, features, and the like are comprehended by the invention as will later appear, and as are inherently possessed by the invention.

Referring briefly to the drawings:

Fig. 1 is a top plan view of the device constructed in accordance with the invention;

Fig. 2 is a view in side elevation with parts shown in section to aid to make the device clear;

Fig. 3 is a front view in elevation with a part shown in section;

Fig. 4 is a side view of a modified part of the means for traction of the device;

Fig. 5 is a side view of a further modified part of the means for traction for sliding of the device; and Fig. 6 is a fragmentary view on an enlarged scale with parts shown in section.

Referring more in detail to the drawings, the device comprises a chassis portion comprising upright supports or struts or braces 10, 10, secured at their upper ends to the wing or main plane part 11, by suitable securing elements, such as screws 12, 12, and at the lower end provided with suitable bearing parts 13, 13 for shafts 14, 14 to which are connected two associated suitable wheels 15, 15 which may have tires or the like 16, 16. To the parts 10, 10 are secured brace members or struts 17, 17 secured to the uprights 10, 10 by suitable securing means or elements 18, 18 and held to the part 11 by suitable securing or holding means 19, 19.

The wing or plane part 11 has a body or fuselage part 20 which rotatably carries a propeller shaft 21 at the forward end of which is carried and attached a propeller or the like 22 and at an intermediate or rear portion of which is carried a propelling wheel or pulley 23 (see Fig. 2 in particular) driven by a belt or the like 24 running from a foot or feet operated driving wheel 25. To this wheel 25 are pivotally or rotatably associated crank parts 26 on which are carried foot pedals or treadles 27, the outer end portions of these crank parts 26 extending through and being rotatable in the bearing part 13, 13 at the lower ends of the uprights or struts 10, 10 and to the outer parts 14, 14 of such shafts being associated rotatably with the wheels 15, 15, or if so chosen may be operatively connected to such wheels 15, 15 so that, if desired, the wheels may be driven by the rider when propelling the foot pedals 27, 27, but it is to be understood that the wheels 15, 15 may turn freely on the shaft ends 14, 14, as desired.

Over the end portions of the part 11 are provided helicopter propellers 28, 28 with shafts 29, 29 extending through the end portions of the wing parts 11, 11 and are rotatable in the holding means 19, 19 (see Fig. 3) on the lower ends of which are attached pulleys or the like 30, 30 over which run driving elements or belts 31, 32 which run to and are driven by pulleys 33, 34 on shaft 21 (see Fig. 2 in particular).

Then the operator or user operates the pedals 27, the drive wheel 25 rotates and drives the belt 24, drives the shaft 21 via the pulley 23, and coordinately the wheels 33 and 34 and hence the belts 31, 32 running to the pulleys 30, 30, connected to and operating the helicopter propellers 28, 28.

Beneath each helicopter 28, 28 is a simulation of an engine or jet engine 35, 35 (see Fig. 6) held in place by a tube 36 and a screw 37 by bolt heads or nuts 19 and 38. The screw 37 is part of the shaft 29 for operating the helicopter 28, 28.

Under the part 11 are attached simulations of motors or the like 39, 39 suitably attached or carried by the body part 11, and these may have openings or the like 40, 40 to effect a sort of whistle or hiss noise when the device moves against the air or the wind or the like to give the impression of engine force or propagation.

At the rear end of the part 20 is flexibly connected or articulated a passenger portion, such as a seat 41, flexibly connected to the part 20 by a hinge element or pin 42 extending in ears or the like 43, 44 of the part 20, and the ear or the like 45 of the part 41. The part 41 has a body or tail section 46 having a tail portion 47 carrying a pivot pin 48 rotatably carrying dolly wheels 49, 49 which movably support the seat 41. At the rear of the seat portion 41 may be a tail part or the like 50, which will act as a back guide for the riding youth. The seat part 41 tapers forwardly to facilitate the child's access of his or her feet on the pedals 27 or the like.

Referring to Fig. 5, in lieu of the wheels 15 sled runners or the like 51, 51 may be used when it is desired to move by sliding or coasting and the like.

Referring to Fig. 4, wheels 52 may be used for coasting, or may be used with the runners or rudder sleds 51 to aid in movement when the runners 51 alone are not free, but the wheels 52 may be used in lieu of the runners 51 too. In the case of using the runners 51, 51, they may be drawn by a pull cord or cable or the like 53.

The seat 41 is tapered toward the forward end thereof to afford room for the rider's legs and access to the pedals 27, 27.

The rear end portions of the simulated engines 35, 35 have preferably rubber or like hand grasping parts or handles 54, 54 which may be slotted as desired, and the body part 11 may have groove handles or hand grasping parts 55, 55 when it is desired to have a closer and more firm grip of the rider.

The simulated motor parts 39, 39 (see Fig. 3) may have openings or passages 40, 40 for the air or wind to make sounds, as whistles, or tones, or hiss, or the like.

While I have herein described and upon the drawing shown an embodiment of the invention, it is to be understood that the invention comprehends other structures, constructions, arrangement of parts, details, features, and the like, without departing or deviating from the spirit of the invention.

Having thus disclosed the invention, I claim:

1. In a toy airplane adapted to support and be propelled by a child, a wing supported on a landing gear including spaced struts, a crank shaft journaled at its ends on the lower end of said struts, wheels secured to opposite ends of said crank shaft, said crank shaft having crank portions to be engaged by the feet of a child to rotate said wheels, a fuselage secured to and depending from said wing between said struts, a propeller shaft journaled on said fuselage and having a propeller secured thereto, said crank shaft having an annular belt receiving recess between said crank portions, a belt engaged in said recess for driving engagement with a pulley secured to said shaft, a tail section including a vertically disposed tail member hingedly connected to the back end of said fuselage, a horizontally disposed seat secured to and supported upon said tail member, and a tail wheel supporting said tail member.

2. A toy of the type set forth in claim 1 and wherein are provided helicopter propellers at the end portions of the wing with pulley and shaft connections for operating said propellers, and belts running from said pulleys on said shaft of said front propeller to said helicopter pulley and shaft connections for operating said helicopter propellers.

(References on following page)

References Cited in the file of this patent

UNITED STATES PATENTS

| | | | |
|---|---|---|---|
| D. 152,632 | Masten | Feb. 8, | 1949 |
| 1,548,434 | Berg | Aug. 4, | 1925 |
| 1,568,459 | Kacirek | Jan. 5, | 1926 |
| 1,658,494 | Otani | Feb. 7, | 1928 |
| 1,705,209 | Ryan | Mar. 12, | 1929 |
| 1,765,701 | Reiss | June 24, | 1930 |
| 2,241,578 | Berg | May 13, | 1941 |
| 2,455,281 | Teta | Nov. 30, | 1948 |
| 2,504,422 | Johnson | Apr. 18, | 1950 |
| 2,564,370 | Myers | Aug. 14, | 1951 |